(12) United States Patent
Ursenbach et al.

(10) Patent No.: US 12,358,620 B2
(45) Date of Patent: Jul. 15, 2025

(54) WEIGHT BALANCED ROTOR BLADE WITH THERMOPLASTIC COMPOSITE WEIGHT

(71) Applicant: Rohr, Inc., Chula Vista, CA (US)

(72) Inventors: Daniel O. Ursenbach, El Cajon, CA (US); Nathaniel M. Gray, Stratham, NH (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/732,169

(22) Filed: Jun. 3, 2024

(65) Prior Publication Data

US 2024/0317394 A1 Sep. 26, 2024

Related U.S. Application Data

(62) Division of application No. 17/856,579, filed on Jul. 1, 2022, now Pat. No. 11,999,471.

(51) Int. Cl.

| B64C 27/473 | (2006.01) |
| B29C 70/30 | (2006.01) |
| B64C 27/00 | (2006.01) |
| B29L 31/08 | (2006.01) |

(52) U.S. Cl.
CPC ............ *B64C 27/473* (2013.01); *B29C 70/30* (2013.01); *B64C 27/008* (2013.01); *B29L 2031/082* (2013.01); *B64C 2027/4736* (2013.01); *F05D 2300/603* (2013.01)

(58) Field of Classification Search
None
See application file for complete search history.

(56) References Cited

U.S. PATENT DOCUMENTS

| 9,487,290 B2 * | 11/2016 | Sherrill | ............... B64C 27/008 |
| 2010/0162565 A1 | 7/2010 | Mukherji | |
| 2012/0034833 A1 | 2/2012 | Schaube | |
| 2012/0301299 A1 * | 11/2012 | Sherrill | ............... B29C 70/302 |
| | | | 428/218 |
| 2019/0032491 A1 | 1/2019 | Nissen | |
| 2020/0247561 A1 | 8/2020 | Rivera | |
| 2020/0398968 A1 | 12/2020 | Sjostedt | |

FOREIGN PATENT DOCUMENTS

| EP | 2256034 A1 * | 12/2010 | ........... B64C 27/473 |
| EP | 2256034 B1 | 12/2011 | |

* cited by examiner

*Primary Examiner* — Juan G Flores
(74) *Attorney, Agent, or Firm* — Getz Balich LLC

(57) ABSTRACT

A rotor blade is provided that includes an airfoil extending spanwise from a base to a tip. The airfoil extends longitudinally (e.g., chordwise) from a leading edge to a trailing edge. The airfoil extends laterally between a first side and a second side. The airfoil includes a body and a weight. The body includes a plurality of body layers. Each of the body layers includes fiber reinforcement within a body thermoplastic matrix. The weight includes a weight layer embedded within the body. The weight layer includes metal powder within a weight thermoplastic matrix.

18 Claims, 6 Drawing Sheets

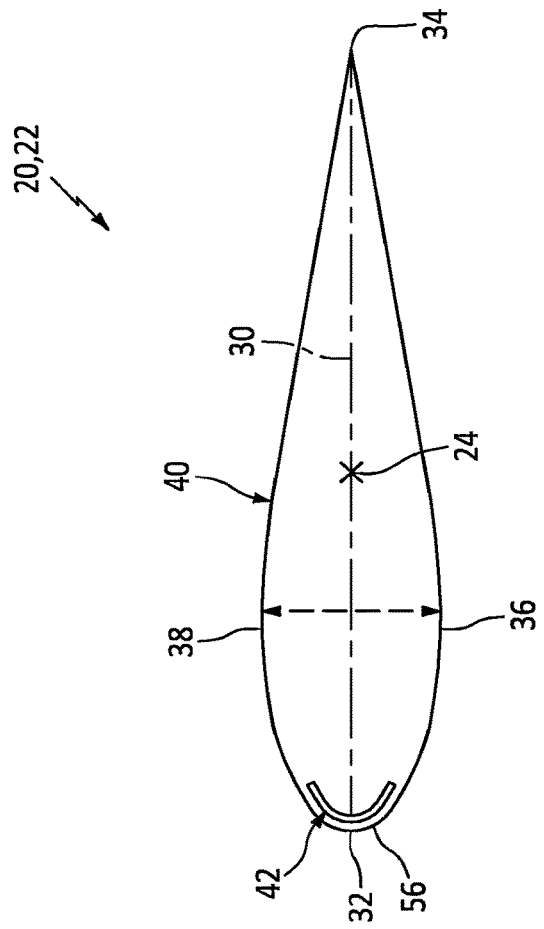
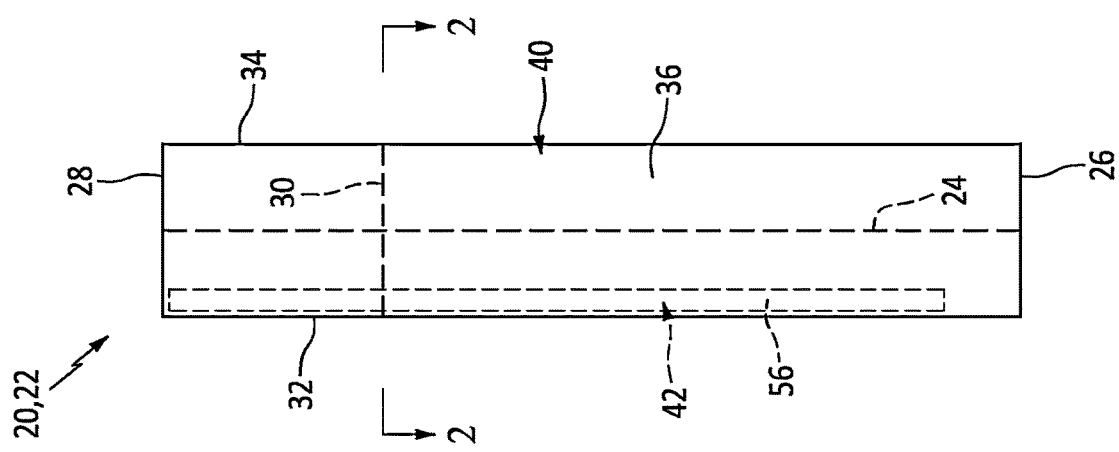

WEIGHT BALANCED ROTOR BLADE WITH THERMOPLASTIC COMPOSITE WEIGHT

This application is a divisional of U.S. patent application Ser. No. 17/856,579 filed Jul. 1, 2022, which is hereby incorporated herein by reference in its entirety.

BACKGROUND

1. Technical Field

This disclosure relates generally to a rotor blade and, more particularly, to a weight balanced rotor blade.

2. Background Information

A rotor blade for a helicopter rotor or a propeller may be weight balanced. Various techniques are known in the art for weight balancing such a rotor blade. For example, material may be selectively removed from the rotor blade, a coating may be selectively applied onto the rotor blade and/or a metal counterweight rod may be embedded within a body of the rotor blade. While these known weight balancing techniques have various benefits, there is still room in the art for improvement. There is a need in the art, in particular, for rotor blade designs and manufacturing techniques which facilitate quicker and less expensive rotor blade manufacturing.

SUMMARY OF THE DISCLOSURE

According to an aspect of the present disclosure, a rotor blade is provided that includes an airfoil extending spanwise from a base to a tip. The airfoil extends longitudinally (e.g., chordwise) from a leading edge to a trailing edge. The airfoil extends laterally between a first side and a second side. The airfoil includes a body and a weight. The body includes a plurality of body layers. Each of the body layers includes fiber reinforcement within a body thermoplastic matrix. The weight includes a weight layer embedded within the body. The weight layer includes metal powder within a weight thermoplastic matrix.

According to another aspect of the present disclosure, another rotor blade is provided that includes an airfoil extending spanwise from a base to a tip. The airfoil extends longitudinally (e.g., chordwise) from a leading edge to a trailing edge. The airfoil extends laterally between a first side and a second side. The airfoil includes a body and a weight. The body includes a body thermoplastic matrix and fiber reinforcement within the body thermoplastic matrix. The weight is fused to the body. The weight includes a weight thermoplastic matrix and metal filler material within the weight thermoplastic matrix. The weight may be configured without (or alternatively with) fiber reinforcement.

According to still another aspect of the present disclosure, a formation method is provided during which a weight layer is formed of metal powder within a weight thermoplastic matrix. A rotor blade is formed, where the forming includes: depositing a first body layer of fiber reinforcement within a body thermoplastic matrix; arranging the weight layer with the first body layer and fusing the weight layer to the first body layer; and depositing a second body layer of fiber reinforcement within a body thermoplastic matrix over the weight layer, and fusing the second body layer to the weight layer and the first body layer.

The forming of the weight layer may include stamping a sheet of the metal powder within the weight thermoplastic matrix.

The forming of the weight layer may include injection molding the weight layer.

The metal filler material may be or otherwise include metal powder.

The body may be formed from a plurality of body layers of the fiber reinforcement within the body thermoplastic matrix. The body layers may include a first body layer and a second body layer. The weight may include a weight layer of the metal filler material within the weight thermoplastic matrix. The weight layer may be disposed within the body between the first body layer and the second body layer.

The weight layer may be configured without fiber reinforcement.

The weight layer may include fiber-reinforcement.

The body thermoplastic matrix and the weight thermoplastic matrix may include a common thermoplastic material.

The body layers may include a first body layer and a second body layer. The weight layer may be embedded within the body between the first body layer and the second body layer.

The weight layer may be adjacent the first body layer and the second body layer.

The body layers may also include a third body layer. The weight may also include a second weight layer embedded within the body between the second body layer and the third body layer. The second weight layer may include metal powder within a weight thermoplastic matrix.

The weight may also include a second weight layer embedded within the body. The second weight layer may include metal powder within a weight thermoplastic matrix.

The weight may be located at the leading edge.

The weight may have an arcuate cross-sectional geometry that follows an arcuate cross-sectional geometry of one of the body layers.

The weight may extend spanwise along at least a major portion of a span of the airfoil from the base to the tip.

The weight layer may have a thickness that changes as the weight layer extends spanwise.

The weight layer may have a thickness that changes as the weight layer extends circumferentially about a span line of the airfoil.

The metal powder may be configured from or otherwise include lead and/or tungsten.

The rotor blade may be configured as a helicopter blade or a propeller blade.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 1 is a side schematic illustration of a rotor blade airfoil.

FIG. 2 is a cross-sectional schematic illustration of the rotor blade airfoil taken along line 2-2 in FIG. 1.

DETAILED DESCRIPTION

Figure 4:
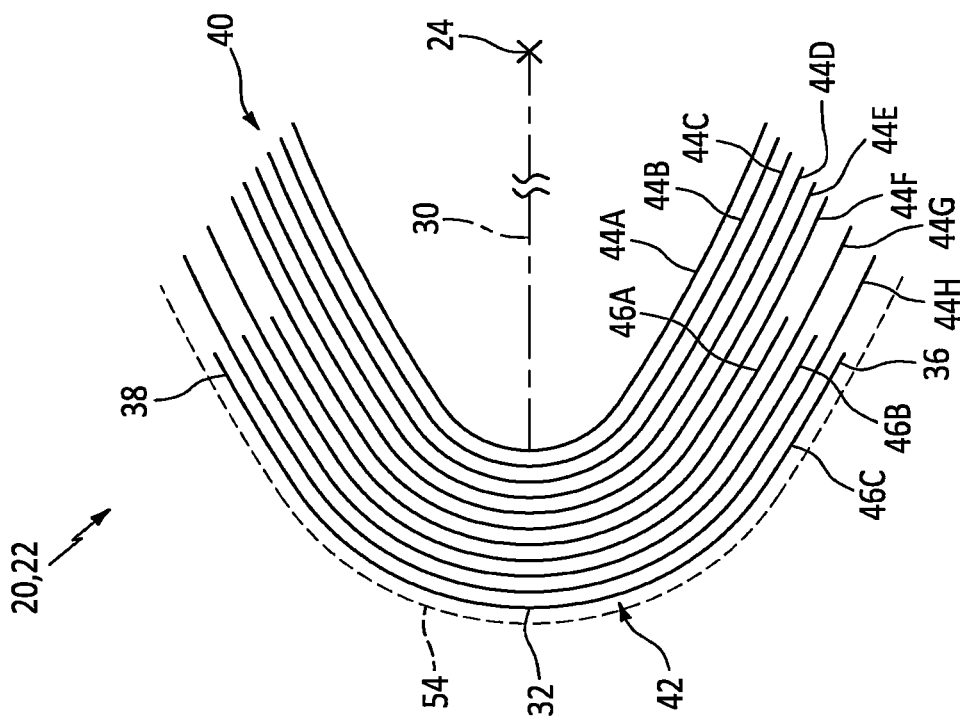
FIG. 4 is a partial cross-sectional schematic illustration of the rotor blade airfoil with another arrangement of layers at the leading edge.

FIGS. 1 and 2 schematically illustrate a weight balanced rotor blade 20 for an aircraft propulsion system. This rotor blade 20 may be configured a helicopter blade for a helicopter (e.g., main) rotor. The rotor blade 20 may alternatively be configured as a propeller blade for a propeller. The present disclosure, however, is not limited to such exemplary rotor blade configurations nor to aircraft propulsion system applications. The rotor blade 20, for example, may alternatively be configured as a fan blade for a fan of a turbofan engine. In another example, the rotor blade 20 may be configured as a turbine blade for a wind turbine.

The rotor blade 20 of FIGS. 1 and 2 includes a rotor blade airfoil 22. The blade airfoil 22 of FIG. 1 extends spanwise along a span line 24 of the blade airfoil 22 between and to a base 26 of the blade airfoil 22 and a (e.g., unsupported, unshrouded) tip 28 of the blade airfoil 22. The blade airfoil 22 of FIGS. 1 and 2 extends longitudinally along a camber line 30 of the blade airfoil 22 between and to a leading edge 32 of the blade airfoil 22 and a trailing edge 34 of the blade airfoil 22. The blade airfoil 22 of FIG. 2 extends laterally (e.g., perpendicular to the camber line 30 and the span line 24) between and to a first (e.g., pressure) side 36 of the blade airfoil 22 and a second (e.g., suction) side 38 of the blade airfoil 22. The blade airfoil 22 of FIGS. 1 and 2 includes a thermoplastic composite airfoil body 40 and a thermoplastic composite airfoil weight 42; e.g., a counterweight.

The airfoil body 40 may substantially (or completely) provide the blade airfoil 22 with its shape and structural integrity. The airfoil body 40 of FIGS. 1 and 2, for example, forms the airfoil base 26, the airfoil tip 28, the airfoil leading edge 32, the airfoil trailing edge 34, the airfoil first side 36 and the airfoil second side 38. The airfoil body 40 may also be self-supporting providing an internal support structure/frame for the blade airfoil 22.

The airfoil body 40 is a fiber-reinforced composite structure. The airfoil body 40 of FIG. 3, for example, is formed from a plurality of body layers 44 (e.g., 44A-H); e.g., stacked and/or otherwise overlapping body layers. Each of these body layers 44 includes a thermoplastic matrix and fiber reinforcement embedded within and/or impregnated by the body thermoplastic matrix. Examples of the body thermoplastic matrix include, but are not limited to, polyether ether ketone (PEEK), polyether ketone ketone (PEKK), polyphenylene sulfide (PPS), polyaryletherketone (PAEK) and polyetherimide (PEI). The fiber reinforcement may include a plurality of fibers, which fibers may be long strand fibers, continuous fibers, etc. Examples of the fiber reinforcement may include, but are not limited to, fiberglass, carbon fibers and aramid (e.g., Kevlar®) fibers.

Referring to FIGS. 1 and 2, the airfoil weight 42 is arranged with the airfoil body 40 to locate/adjust a center of gravity (COG) of the blade airfoil 22 along the camber line 30. The airfoil weight 42 may thereby provide the rotor blade 20 and its blade airfoil 22 with a predetermined mass balance to facilitate rotor blade operation. The airfoil weight 42 of FIGS. 1 and 2, for example, is arranged at (e.g., on, adjacent or proximate) the airfoil leading edge 32 to adjust the center of gravity/the airfoil mass balance forward towards the airfoil leading edge 32 along the camber line 30.

The airfoil weight 42 of FIGS. 1 and 2 is located adjacent the airfoil leading edge 32, a leading edge portion of the airfoil first side 36 and a leading edge portion of the airfoil second side 38. This airfoil weight 42 may extend longitudinally along one or more of the airfoil features (e.g., 32, 36 and/or 38) for at least a major portion (e.g., 60%, 70%, 80%, 90% or more) of a span of the blade airfoil 22 from the airfoil base 26 to the airfoil tip 28. In other embodiments, however, the airfoil weight 42 may extend longitudinally along the airfoil features (e.g., 32, 36 and/or 38) for less than a major portion of the airfoil span. In either embodiment, the airfoil weight 42 may be positioned at the airfoil tip 28, at the airfoil base 26 or intermediately (e.g., midway) between the airfoil tip 28 and the airfoil base 26.

Figure 3:
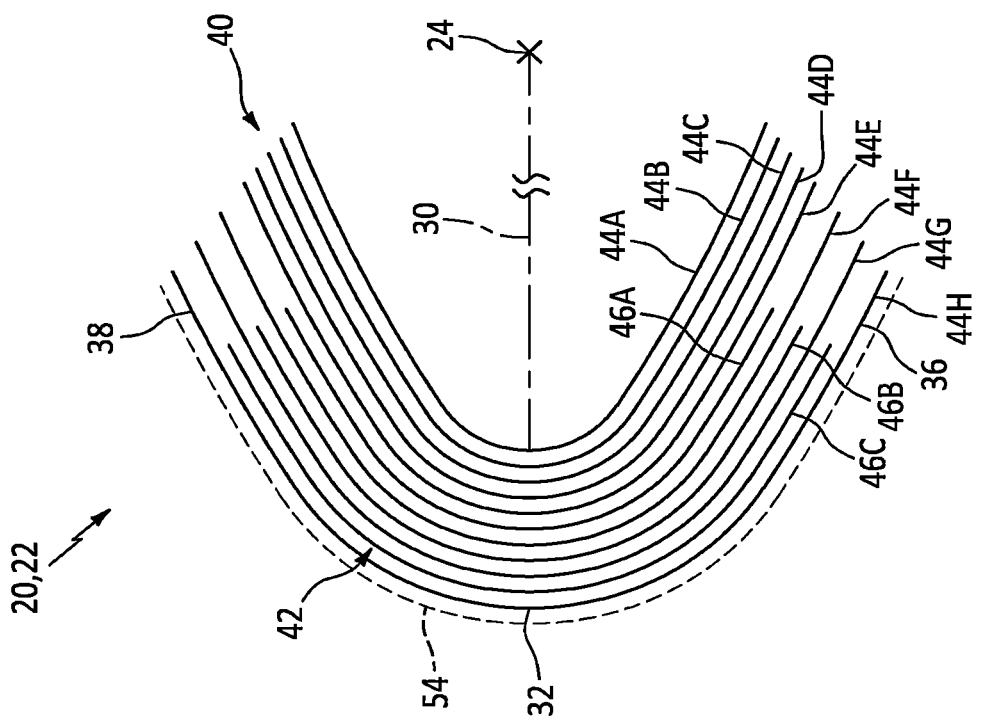
FIG. 3 is a partial cross-sectional schematic illustration of the rotor blade airfoil with an arrangement of layers at a leading edge.

Referring to FIG. 3, the airfoil weight 42 may be (e.g., completely) embedded within the airfoil body 40. In other embodiments however, referring to FIG. 4, at least a portion (or an entirety) of the airfoil weight 42 may also or alternatively at least partially form one or more exterior features (e.g., 32, 36 and/or 38) of the blade airfoil 22.

Referring to FIGS. 3 and 4, the airfoil weight 42 may include one or more weight layers 46 (e.g., 46A-C). Each of these weight layers 46 includes a thermoplastic matrix and filler material embedded within the weight thermoplastic matrix. Examples of the weight thermoplastic matrix include, but are not limited to, polyether ether ketone (PEEK), polyether ketone ketone (PEKK), polyphenylene sulfide (PPS), polyaryletherketone (PAEK) and polyetherimide (PEI). The weight thermoplastic matrix and the body thermoplastic matrix may be a common (e.g., the same) thermoplastic material. Providing such a common thermoplastic material may facilitate fusing of the weight layers 46 to the body layers 44 as described below. However, in other embodiments, the weight thermoplastic matrix may be a different material than the body thermoplastic matrix; particularly, where the weight and the body thermoplastic matrix materials are fusible (e.g., weldable) to one another. The filler material is selected as a material that is denser than the weight thermoplastic matrix, the body thermoplastic matrix and/or the fiber reinforcement. The filler material, for example, may be metal powder. Examples of metal powder include, but are not limited to, lead (Pb) powder and/or tungsten (W) powder. Other examples of the filler material may include, but are not limited to, metal filings, metal shavings and/or other metal particles.

In general, none of the weight layers 46 may include or may otherwise be configured with (e.g., any) fiber reinforcement within the weight thermoplastic matrix. Rather, each weight layer is constructed from a solid mass of (e.g., only)

the filler material (e.g., metal powder) embedded within the weight thermoplastic matrix. However, one or more of the weight layers 46 may alternatively include fiber reinforcement and/or nano-particles. For example, thermoplastic resin with milled fiber, as used in injection grade thermoplastic, or chopped fiber, as used in compression molding material, may also be included within one or more of the weight layers 46. This optional fiber-reinforcement may improve structural properties of the weight layers 46 where, for example, the fiber-reinforcement does not galvanically couple to the dense metal; e.g., as may be the case with steel and carbon fiber. Nano-particles may also or alternatively be added into one or more of the weight layers 46 to increase strength. To this point, the more metal powder in the weight layers 46, the more brittle and weaker the weight layers 46 may become. Therefore, adding fiber-reinforcement and/or nano-particles may increase overall strength of the weight layers 46. However, under certain condition, it may be impractical to include both fiber-reinforcement and densification metal in the weight layers 46.

Figure 5A:
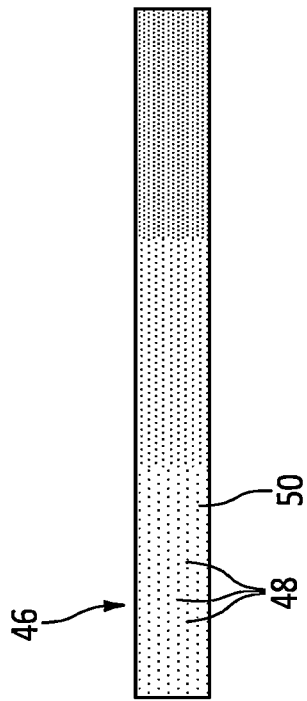
FIG. 5A is a schematic illustration of a weight layer with a homogeneous mixture of filler material within a thermoplastic matrix.
Figure 5B:
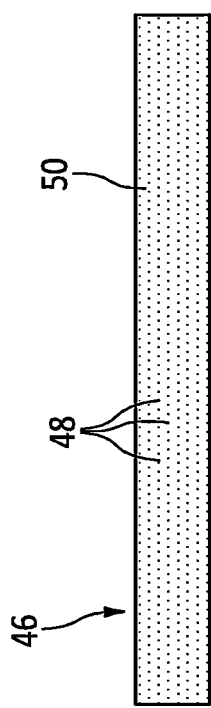
FIG. 5B is a schematic illustration of the weight layer with a heterogenous mixture of the filler material within the thermoplastic matrix.

Referring to FIG. 5A, the filler material (e.g., 48) may be homogeneously mixed with the weight thermoplastic material (e.g., 50) such that each unit of volume of a respective weight layer 46 has the same weight. Alternatively, referring to FIG. 5B, the filler material (e.g., 48) may be heterogeneously mixed with the weight thermoplastic material (e.g., 50) such that at least one (or more) unit of volume of a respective weight layer 46 has a different weight than another unit of volume of that respective weight layer 46. The filler material (e.g., 48), for example, may be mixed with the weight thermoplastic matrix (e.g., 50) to provide a mass gradient along (e.g., across) the respective weight layer 46.

Figure 6A:
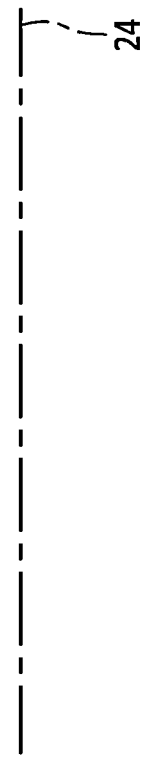
FIG. 6A is a schematic illustration of the weight layer with a thickness uniform along a span line.
Figure 6B:
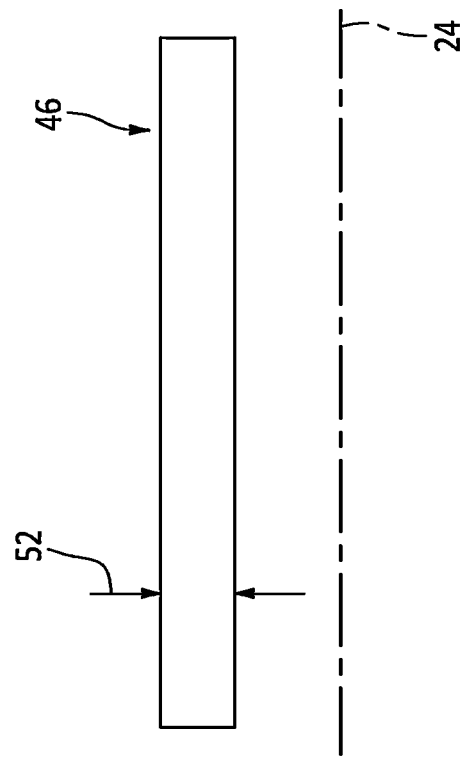
FIG. 6B is a schematic illustration of the weight layer with its thickness variable along the span line.

Referring to FIG. 6A, one or more or all of the weight layers 46 may each have a uniform (e.g., constant) thickness 52 as that weight layer 46 extends spanwise along the span line 24. Alternatively, referring to FIG. 6B, one or more or all of the weight layers 46 may each have a changing (e.g., variable, tapered, etc.) thickness 52 as that weight layer 46 extends spanwise along the span line 24. Providing such a variable thickness 52 facilitates tuning mass balancing along the span line 24 without requiring, for example, multiple different uniform thickness layers one on top of the other.

Figure 7B:
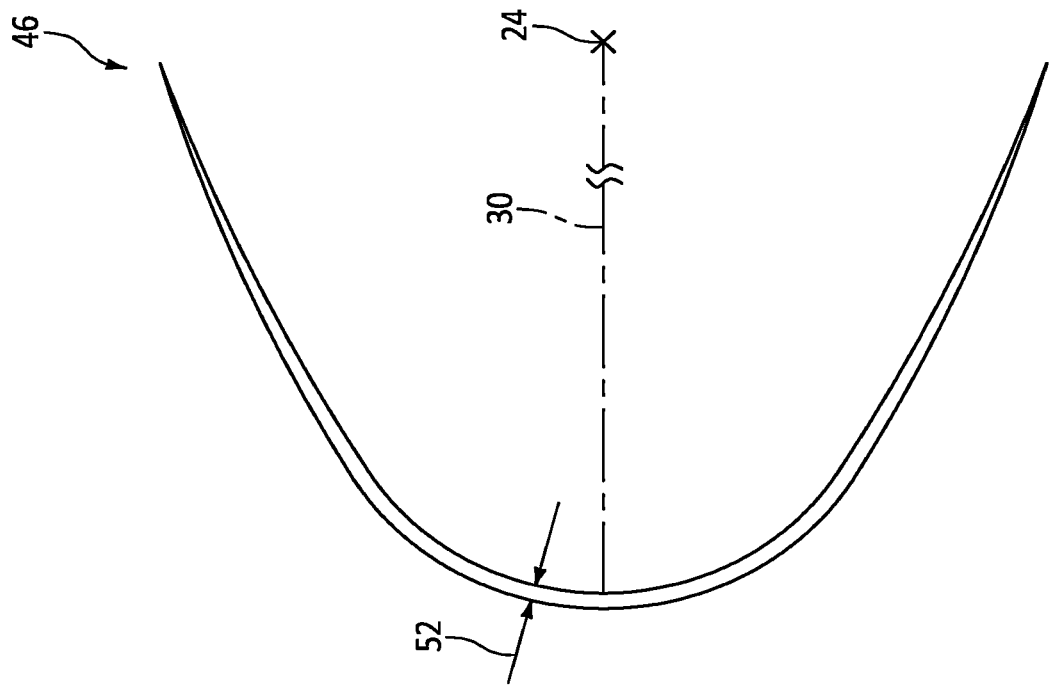
FIG. 7B is a schematic illustration of the weight layer with its thickness variable circumferentially about the span line.
Figure 7A:
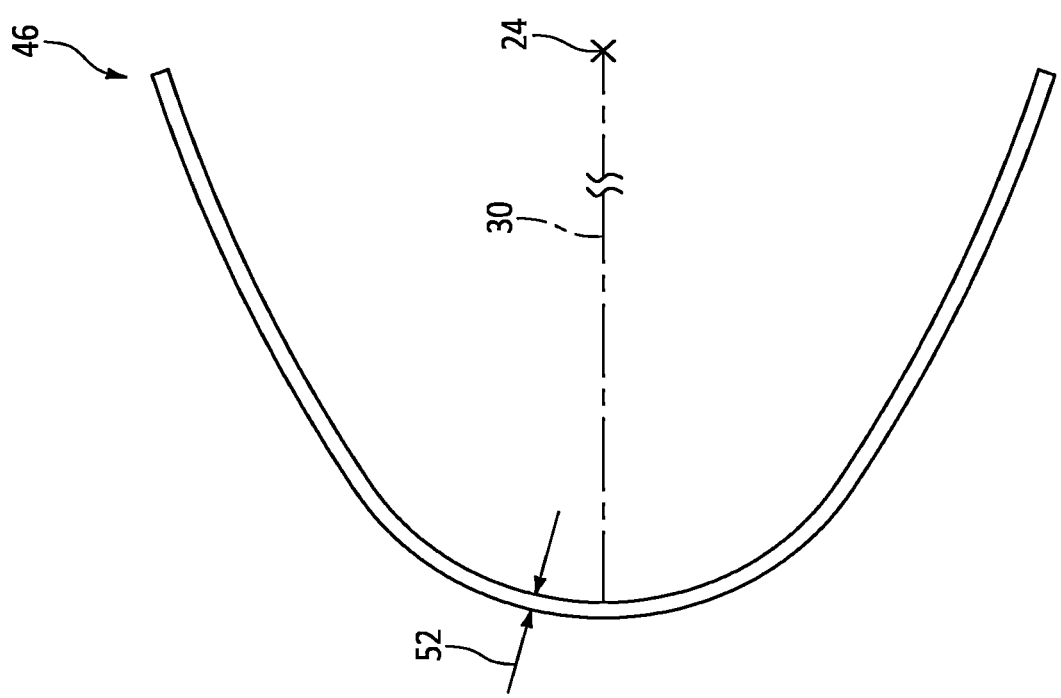
FIG. 7A is a schematic illustration of the weight layer with its thickness uniform circumferentially about the span line.

Referring to FIG. 7A, one or more or all of the weight layers 46 may each have a uniform (e.g., constant) thickness 52 as that weight layer 46 extends circumferentially about the span line 24. Note, this embodiment of FIG. 7A may be paired with the embodiment of FIG. 6A or 6B. Alternatively, referring to FIG. 7B, one or more or all of the weight layers 46 may each have a changing (e.g., variable, tapered, etc.) thickness 52 as that weight layer 46 extends circumferentially about the span line 24. Providing such a variable thickness 52 facilitates tuning mass balancing about the span line 24 without requiring, for example, multiple different uniform thickness layers one on top of the other. Note, this embodiment of FIG. 7B may be paired with the embodiment of FIG. 6A or 6B.

Referring to FIG. 3, one or more or all of the weight layers 46 may each be arranged between a respective (e.g., adjacent) pair of the body layers 44; e.g., the weight layer 46A is between the body layers 44E and 44F. Each weight layer 46 of FIG. 3, in particular, is also abutted against, engaged with and joined or fused to one or both of the respective adjacent pair of the body layers 44; e.g., the weight layer 46A is abutted against, engaged with and joined or fused to the body layers 44E and 44F. Each body layer 44 in a respective adjacent pair (e.g., completely) overlaps a respective weight layer 46; e.g., the body layers 44E and 44F overlap the weight layer 46A. Each body layer 44 in a respective adjacent pair may also overlap and may be joined or fused to the other body layer 44 in the respective adjacent pair; e.g., the body layer 44E overlaps and is joined or fused to the body layer 44F. Each weight layer 46 of FIG. 3 is thereby sandwiched between and may be encapsulated by the respective adjacent pair of the body layers 44. The present disclosure, however, is not limited to such an exemplary arrangement. Furthermore, referring to FIG. 4, at least (or only) one of the weight layers (e.g., 46C) may be abutted against, engaged with and joined or fused to a respective body layer (e.g., 44H), but not embedded within the airfoil body 40 between a respective (e.g., adjacent) pair of the body layers 44. In such embodiments, the exterior weight layer (e.g., 46C) may partially form the one or more airfoil features (e.g., 32, 36 and/or 38) as described above. Of course, it is also contemplated the blade airfoil 22 may include one or more exterior protective layers 54 over the exterior weight layer(s) (e.g., 46C) and the exterior body layer(s) (e.g., 44H); see dashed line.

Referring to FIGS. 3 and 4, one or more or all of the weight layers 46 may each have a curved (e.g., arcuate) or otherwise non-straight cross-sectional geometry (see also FIGS. 7A and 7B) when viewed, for example, in a reference plane perpendicular to the span line 24; e.g., plane of FIG. 3 or 4. The cross-sectional geometry of the weight layer 46 may be shaped to substantially follow (e.g., have the same shape as) an exterior surface 56 of the rotor blade 20 and its blade airfoil 22 (see FIG. 2) at, for example, the airfoil leading edge 32. The cross-sectional geometry of the weight layer 46 may also or alternatively be shaped to substantially follow a curved (e.g., arcuate) or otherwise non-straight cross-sectional geometry of an adjacent (e.g., inner or outer) body layer 44.

The blade airfoil 22 is described above with multiple weight layers 46 forming the airfoil weight 42. However, in other embodiments, the airfoil weight 42 may be formed from (e.g., only include) a single one of the weight layers 46. This single weight layer 46 may be positioned at a location of any one of the other weight layers 46 in FIG. 3 or 4, or otherwise.

Figure 8:
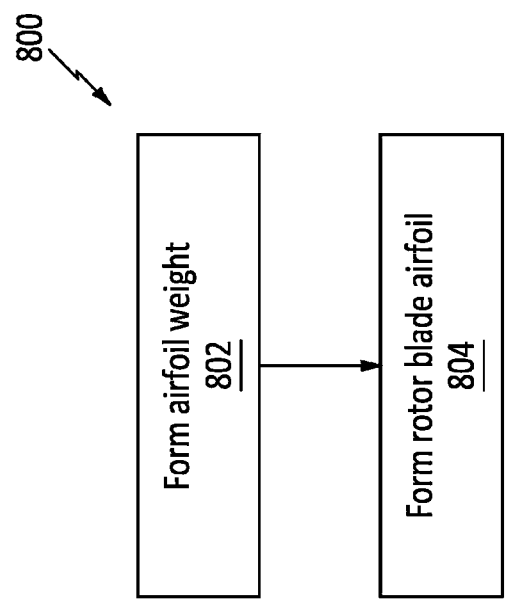
FIG. 8 is a flow diagram of a method for forming a rotor blade.

FIG. 8 is a flow diagram of a method 800 for forming a rotor blade. For case of description, the formation method 800 is described below with reference to the rotor blade 20 described above. The present disclosure, however, is not limited to forming any particular rotor blade types or configurations.

In step 802, the airfoil weight 42 and its one or more weight layers 46 are formed. Each weight layer 46, for example, may be formed by stamping a sheet of the filler material embedded within the weight thermoplastic matrix. Alternatively, a mixture of the filler material and the weight thermoplastic matrix may be injected into a form to injection mold one or more of the weight layers 46. The present disclosure, however, is not limited to the foregoing exemplary formation techniques. For example, in other embodiments, one or more of the weight layers 46 may alternatively be formed via casting, additive manufacturing, etc. In general, the forming step 802 occurs prior to and discrete from formation of the rest of the blade airfoil 22.

Figure 9C:
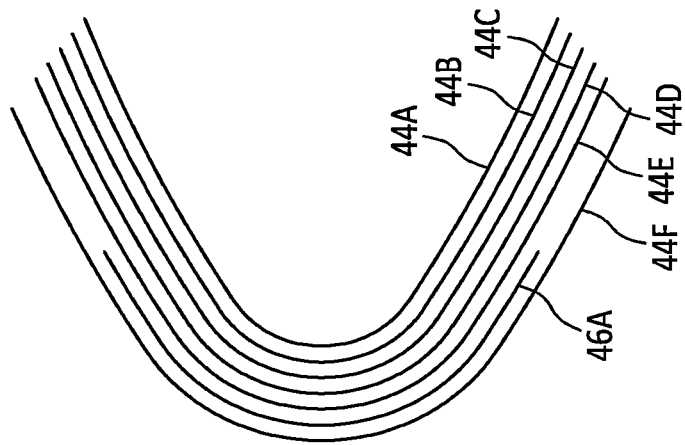
FIGS. 9A-C are schematic illustrations depicting various steps during the formation method.
Figure 9B:
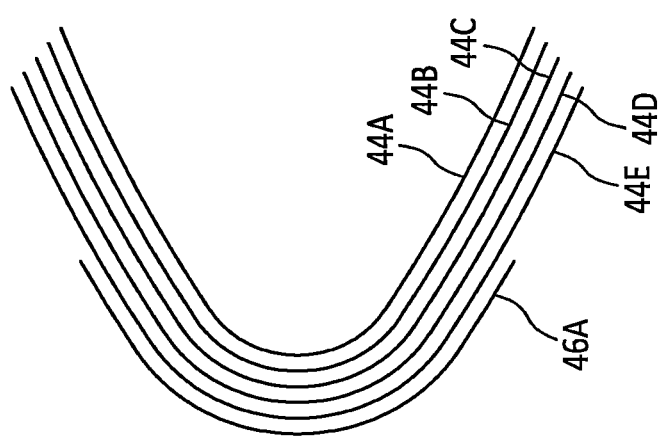
Figure 9A:
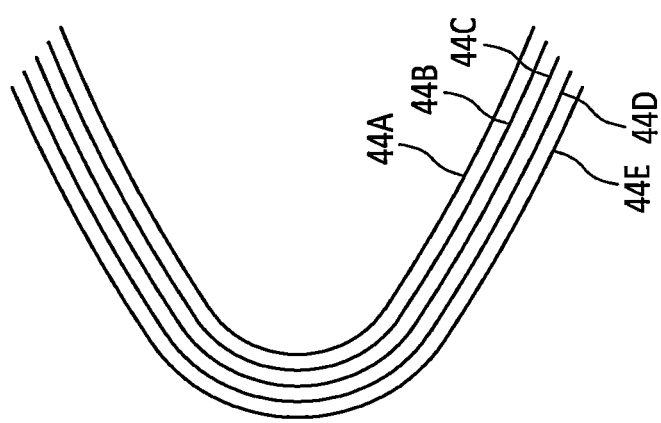

In step 804, the blade airfoil 22 is formed. The body layers 44, for example, are deposited about a form (e.g., a mold, a preform, etc.) and consolidated to form the blade airfoil 22. During this buildup process, one or more of the weight layers 46 may be placed and joined or fused to the body layers 44 such that the weight layers 46 are embedded within and/or otherwise arranged with the airfoil body 40; e.g., see FIGS. 3 and 4. For example, referring to FIG. 9A, a first body layer (e.g., 44E) is deposited and consolidated with one or more underlying body layers (e.g., 44A-D). Referring to FIG. 9B, a first weight layer (e.g., 46A) is arranged with the first body layer (e.g., 44E). The first weight layer (e.g., 46A) of FIG. 9B, for example, is disposed (e.g., arranged, located, etc.) on and overlaps the first body layer (e.g., 44E). This first weight layer (e.g., 46A) is joined or fused to the first body layer (e.g., 44E) to consolidate the first weight layer (e.g., 46A) with the first body layer (e.g., 44E) and the underlying body layers 44. Referring to FIG. 9C, a second body layer (e.g., 44F) is arranged with the various previously deposited and consolidated layers (e.g., 44A-E and 46A). The second body layer (e.g., 44F) of FIG. 9C, for example, is disposed on and overlaps the first weight layer (e.g., 46A) and the first body layer (e.g., 44E). This second body layer (e.g., 44F) is joined or fused to the first weight layer (e.g., 46A) and the first body layer (e.g., 44E) to consolidate the second body layer (e.g., 44F) with the underlying layers (e.g., 44A-E and 46A). This process may be repeated as many times as needed until the airfoil weight 42 and the airfoil body 40 are completely formed; e.g., built up.

In some embodiments, one or more finishing operations may be performed to the blade airfoil 22 following the formation step 804. Examples of these finishing operations include, but are not limited to, a finish machining operation and a coating operation.

The formation method 800 may facilitate rapid and repeatable formation of the rotor blade 20. For example, the formation step 804 may be performed using automated fiber placement (AFP) device or stamp forming. Furthermore, the formation method 800 also facilitates tailoring and refining mass balancing of the rotor blade 20.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A formation method, comprising:
   forming a weight layer of metal powder within a weight thermoplastic matrix, wherein the weight layer is configured without fiber reinforcement; and
   forming a rotor blade, the forming of the rotor blade comprising
      depositing a first body layer of fiber reinforcement within a body thermoplastic matrix;
      arranging the weight layer with the first body layer and fusing the weight layer to the first body layer; and
      depositing a second body layer of fiber reinforcement within a body thermoplastic matrix over the weight layer, and fusing the second body layer to the weight layer and the first body layer.

2. The formation method of claim 1, wherein the forming of the weight layer comprises stamping a sheet of the metal powder within the weight thermoplastic matrix.

3. The formation method of claim 1, wherein the forming of the weight layer comprises injection molding the weight layer.

4. The formation method of claim 1, wherein
   an airfoil of the rotor blade includes the first body layer, the weight layer and the second body layer;
   the airfoil extends spanwise from a base to a tip;
   the airfoil extends longitudinally from a leading edge to a trailing edge; and
   the airfoil extends laterally between a first side and a second side.

5. The formation method of claim 1, wherein the body thermoplastic matrix of the first body, the body thermoplastic matrix of the second body and the weight thermoplastic matrix comprise a common thermoplastic material.

6. The formation method of claim 1, wherein the weight layer is embedded within the rotor blade between the first body layer and the second body layer.

7. The formation method of claim 1, wherein the weight layer is adjacent the first body layer and the second body layer.

8. The formation method of claim 1, wherein
   the rotor blade further includes a third body layer and a second weight layer embedded within the rotor blade between the second body layer and the third body layer; and
   the second weight layer includes metal powder within a weight thermoplastic matrix.

9. The formation method of claim 1, wherein the weight layer is located at a leading edge of the rotor blade.

10. The formation method of claim 1, wherein the weight layer has an arcuate cross-sectional geometry that follows an arcuate cross-sectional geometry of one of the first body layer or the second body layer.

11. The formation method of claim 1, wherein the weight layer extends spanwise along at least a major portion of a span of an airfoil of the rotor blade from a base of the airfoil to a tip of the airfoil.

12. The formation method of claim 1, wherein the weight layer has a thickness that changes as the weight layer extends spanwise along a span line of an airfoil of the rotor blade.

13. The formation method of claim 1, wherein the weight layer has a thickness that changes as the weight layer extends circumferentially about a span line of an airfoil of the rotor blade.

14. The formation method of claim 1, wherein the metal powder comprises at least one of lead or tungsten.

15. The formation method of claim 1, wherein the rotor blade is configured as one of a helicopter blade or a propeller blade.

16. A formation method, comprising:
   forming an airfoil, wherein the airfoil extends spanwise from a base to a tip, the airfoil extends longitudinally from a leading edge to a trailing edge, the airfoil extends laterally between a first side and a second side, and the airfoil includes a body and a weight;
   the forming of the airfoil comprising
      disposing metal filler material within a weight thermoplastic matrix to provide the weight, wherein the weight is configured without fiber reinforcement; and
      disposing fiber reinforcement within a body thermoplastic matrix to provide the body, wherein the weight is embedded within the body.

17. The formation method of claim 16, wherein the metal filler material comprises metal powder.

18. The formation method of claim 16, wherein
the body is formed from a plurality of body layers of the fiber reinforcement within the body thermoplastic matrix, and the plurality of body layers include a first body layer and a second body layer; and
the weight comprises a weight layer of the metal filler material within the weight thermoplastic matrix, and the weight layer is disposed within the body between the first body layer and the second body layer.

* * * * *